Jan. 14, 1947.    D. MAPES    2,414,113
TEST MEANS FOR HIGH PRESSURE FLUID MEDIUM CONTAINERS
Filed Sept. 26, 1944
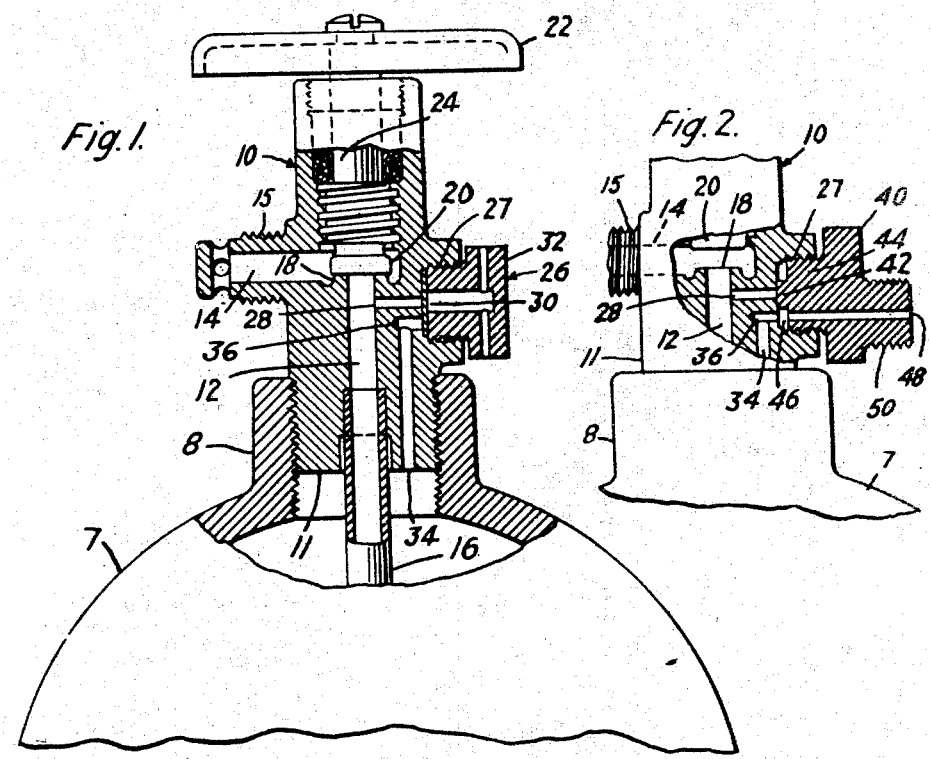
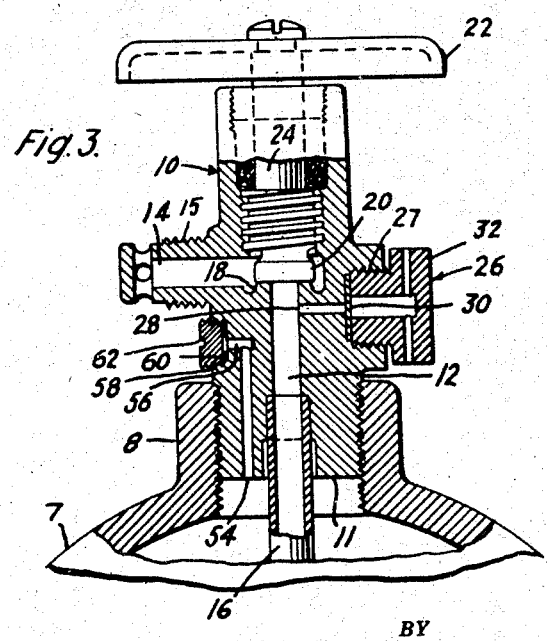
INVENTOR
DANIEL MAPES
BY Ernest A. Perrien
ATTORNEY Patented Jan. 14, 1947

2,414,113

UNITED STATES PATENT OFFICE 2,414,113

TEST MEANS FOR HIGH-PRESSURE FLUID MEDIUM CONTAINERS

Daniel Mapes, West Caldwell, N. J., assignor to Specialties Development Corporation, Bloomfield, N. J., a corporation of New Jersey Application September 26, 1944, Serial No. 555,877

5 Claims. (Cl. 73—37)

This invention relates to containers for high pressure fluid medium, and more particularly to discharge heads for such containers provided with means for facilitating hydrostatically testing the heads and containers.

Containers for storing high pressure fluid medium, such as compressed or liquefied gasses, are required to be tested initially and retested periodically to determine whether or not they can safely withstand the internal pressures to which they normally may be subjected. To accomplish this purpose, the containers are filled completely with a testing fluid, such as water, and are subjected to a hydrostatic pressure of certain value for a predetermined period of time. Thereafter, the testing fluid is drained from the containers, and the containers which have passed the test may be filled or refilled with the high pressure fluid medium to be stored therein.

Heretofore it has been customary to disconnect the discharge head from the container while conducting the test. Since the discharge head is secured to the container by a tightly fitting threaded connection, frequent removal and replacement of the discharge head damages the threads. This results in a poor connection which is ineffective to confine the pressure medium in the container against leakage, and in some instances results in the discharge head being dislodged from the container with explosive violence by the stored high pressure medium. It has been proposed to eliminate the necessity of removing the discharge head, during hydrostatic testing, by providing the container with an auxiliary opening, but such openings weaken the container structure and provide additional points at which leakage may occur.

An object of the present invention is to provide for the hydrostatic testing of high pressure fluid medium containers without the necessity of removing the discharge head while overcoming the difficulties and disadvantages heretofore encountered.

Another object is to provide for the hydrostatic testing of containers without modifying the construction of the container.

Another object is to provide a discharge head having means for hydrostatically testing high pressure fluid medium containers.

Another object is to provide a discharge head of the foregoing character adapted to facilitate charging containers with a test fluid and completely removing the test fluid therefrom.

Another object is to provide novel and effective test means adapted to be incorporated in a standard discharge head.

Another object is to provide a device, of the above indicated character, which is simple and durable in construction, economical to manufacture, and effective in its operation.

Other objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawing, forming a part of the specification, wherein:

Figure 1 is a side elevational view, partially in section, of a discharge head connected to a container illustrating an embodiment of the invention.

Figure 2 is a fragmentary view of a portion of Figure 1, showing an adaptor plug employed during the testing operation.

Figure 3 is a view, similar to Figure 1, of the invention in modified form.

Referring to Figure 1, there is shown a metallic container 7 of generally cylindrical shape adapted for storing high pressure fluid mediums such as liquid carbon dioxide. The container 7 is constructed in a usual manner having a constricted tubular neck 8 to which a discharge head 10 is secured, as by a tubular portion 11 screw threaded or otherwise fitted in the neck.

The discharge head 10 has an inlet bore 12 in the portion 11 and has an outlet 14 communicating with the bore 12 and terminating in a nipple 15 adapted for connection to a hose which conducts the stored medium to a point of discharge. A syphon tube 16 is secured to the tubular portion 11 of the discharge head 10 in communication with the bore 12, and extends into the container 7 to a position close to the bottom or closed end of the container. The inlet bore 12 and outlet 14 constitute a main conduit of the discharge head.

A valve seat 18 is formed intermediate the inlet bore 12 and the outlet 14 for receiving a valve member 20 adapted to control the discharge of the fluid medium from the container 7. A handwheel 22 and a threaded stem 24 are provided to operate the valve member 20.

A safety discharge assembly 26 comprising a safety disc 30 and an apertured plug 32 is provided in a recess 27 in the side of the tubular portion 11 at the outside of the container 7, for discharging the contents of the container 7 through a safety discharge opening 28 and the plug 32 in the event that the pressure within the container exceeds a safe working pressure. The safety discharge of the contents of the container 7 is controlled by the safety disc 30 held in position by the plug 32 and adapted to be ruptured by excessive pressure.

In accordance with the invention in the form shown in Figure 1, a test circuit conduit 34 is formed in the tubular portion 11, separated from the inlet bore 12, and extending from a position in communication with the interior of the container 7 to a short conduit 36 of the test circuit extending laterally of the tubular portion 11, to the recess 27.

In this construction, the valve member 20 normally closes one end of a fluid circuit through the bore 12, the syphon tube 16, the container 7, the test circuit conduits 34 and 36 to the recess 27, which is normally closed by the safety disc 30 as held by the plug 32.

Referring to Figure 2, an adaptor plug 40 is shown connected in the recess 27 which comprises an inner tip end portion 42 of larger diameter than the opening 28 and adapted for closing the latter, and of smaller diameter than the recess 27 which, with a body portion 44 screw threadedly fitting the recess 27, provides an annular recess 46 in communication with the conduit 36. A conduit 48 in the plug 40 extends from the annular recess 46 through the body 44 of the plug, and through a nipple portion 50 thereof, for discharge of the test fluid, as through a hose, attached to the nipple 50, to a receptacle or drain.

By the construction of the plug 40 as above stated, whereby the conduit 48 communicates with the annular recess 46, the opening 48 may assume any position about the axis of the recess 46 necessary to have the tip end portion 42 in tight sealing relation to the conduit 28, the conduit 48 being shown in this instance in registry with the conduit 36.

Referring to Figure 1, the parts are shown in the normal positions thereof when the container 7 contains fluid medium. When the latter is to be discharged, it is only necessary to turn the handwheel 22 to lift the valve member 20 from the valve seat 18, whereupon the fluid medium passes from the container 7 through the syphon tube 16, the bore 12 and the outlet 14 to the point of discharge.

In the testing operation, to fill the container 7, with a testing fluid, for example water, the valve member 20 is unseated. The plug 32 is unscrewed and the disc 30 is removed, and replaced by the plug 40 which is screwed into the recess 27 to provide for the escape of air from the container through its opening 48. With the container 7 filled through the inlet 14, the opening 48 of the plug 40 is closed by a cap or the like (not shown), applied to the nipple 50 and pressure is applied through the inlet 14 to the test fluid to determine the condition of the seals at the stem 24, the recess 27, and between the tubular portion 11 and the neck 8, and to hydrostatically test the container 7 for possible defects.

The test fluid is removed from the container by way of the nipple 15 while the valve member 20 is unseated and the opening 48 is unclosed, by inverting the container to allow the test fluid to drain by gravity. If the test fluid used is water, any water in the syphon tube 16 discharges through the bore 12 and the outlet 14 and water in the container 7 drains through the conduit 34 and the conduit 36 to the recess 27. During the draining operation, with the plug 40 in the recess 27, hose connections may be provided for the nipple 15 of the outlet 14 and the nipple 50 of the plug 40 to carry the water to a point of disposal away from the testing position.

After the bulk of the water is drained, with the plug 40 placed in the recess 27 to close the conduit 28, a hose is coupled to the outlet 14 for blowing compressed air or the like through the bore 12 and the syphon tube 16 to the container 7 and, from the latter, through the conduits 34, 36 and 48 directly to the atmosphere or through a hose attached to the nipple 50. The air serves to expel the last traces of water from the container and the discharge head. If desired, dry hot air may be utilized for blowing out the container to provide a drying action to effect removal of all traces of moisture.

Referring to Figure 3, in which corresponding parts are designated by corresponding reference numerals, the structure is quite similar to that of Figures 1 and 2, except that the safety assembly 26 and the safety disc 30 are replaced by a plug for closing the opening 28 during the foregoing described test to prevent rupturing of the safety disc.

A conduit 54, corresponding somewhat to the conduit 34 of Figures 1 and 2, but different in that it does not communicate with the recess 27, extends through the tubular portion 11 from the inner end thereof, to a conduit 56 which extends laterally of the side wall therein to a recess 58 in the side wall outside the container 7. The recess 58 is normally sealed, as by a gasket 60 and a plug 62, which may be replaced by a nipple or hose connector.

In Figure 3, the parts are also shown in the normal position thereof when the container 7 contains the stored fluid medium, which for discharge requires only the turning of the handwheel 22 to unseat the valve member 20, whereupon the medium passes from the container 7, through the syphon tube 16, the bore 12 and the outlet 14.

In testing the structure of Figure 3, to fill the container 7, the valve member 20 is unseated and, with the plug 62 partially or fully removed from its sealing position to vent the fluid circuit, water is admitted through the outlet 14. The adaptor 40 will be used to close off the opening 28.

By screwing down or replacing the plug 62, and the gasket 60, the above described pressure test may be effected through the outlet 14. Drainage and drying are also effected as described in connection with Figures 1 and 2.

From the foregoing description it will be seen that the present invention provides an improved discharge head for a standard high pressure fluid medium container which cooperates with the container, to produce a novel test circuit of better effect in filling, testing, emptying and drying the container and the discharge head. It provides better working conditions at the place of testing, is better organized in its mode of operation, is more certain in its results, and has many other advantages. The discharge head is rugged in construction and can readily withstand any rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. The combination of a container for a high pressure fluid medium, the container having a constricted outlet neck, a discharge head embodying a tubular portion mounted in said neck, having an inner bore and an outlet portion from said bore, said discharge head having an exterior side recess outside the container extending laterally of said tubular portion, and a safety discharge conduit extending from said recess to said inner bore and being of smaller diameter than the recess to thereby form a shoulder, said discharge head also having a test conduit extending laterally of said tubular portion between said shoulder and a position short of said inner bore, there being a test conduit in said tubular portion communicating between the interior of said container and said first test conduit, a safety disc in said recess over said shoulder sealing said safety discharge conduit and said first test conduit, a safety plug in said recess, holding said disc in position, a syphon tube secured to said tubular portion in communication with said bore and extending into the container, and a discharge valve for said outlet portion.

2. The combination of a container for a high pressure fluid medium, the container having a constricted outlet neck, a discharge head embodying a tubular portion mounted in said neck, having an inner bore and an outlet portion from said bore, said discharge head having an exterior side recess outside the container extending laterally of said tubular portion, and a safety discharge conduit extending from said recess to said inner bore and being of smaller diameter than the recess to thereby form a shoulder, said discharge head also having a test conduit extending laterally of said tubular portion between said shoulder and a position short of said inner bore, a test conduit in said tubular portion communicating between the interior of said container and said first test conduit, a safety disc in said recess over said shoulder sealing said safety discharge conduit and said first test conduit, a safety plug in said recess holding said disc in position, a syphon tube secured to said tubular portion in communication with said bore and extending into the container, a discharge valve for said outlet portion, and a test plug adapted to replace said safety plug having an inner end portion for closing said safety discharge conduit, said inner end portion cooperating with a body portion of the test plug and a portion of the discharge head about said recess to form an annular chamber about said inner end portion, the test plug also having a conduit therethrough between said annular chamber and the exterior of the test plug.

3. The combination of a container for a high pressure fluid medium, the container having a constricted outlet neck, a discharge head embodying a tubular portion mounted in said neck having an inner bore and an outlet portion from said bore, said discharge head having an exterior side recess outside the container extending laterally of said tubular portion, and a safety discharge conduit extending from said recess to said inner bore and being of smaller diameter than the recess to thereby form a shoulder, a safety disc in said recess over said shoulder sealing said safety discharge conduit, a plug in said recess holding said safety disc in position, said discharge head also having a second exterior side recess outside the container extending laterally of said tubular portion, a test conduit extending laterally of said tubular portion between said second recess and a position short of said inner bore, a test conduit in said tubular portion communicating between the interior of said container and said first test conduit, a plug in said second recess, a syphon tube secured to said tubular portion in communication with said bore and extending into the container, and a discharge valve for said outlet portion.

4. A valve head comprising a body having a portion adapted to be secured to the neck of a container and having a main conduit extending from the underside of said portion to the exterior of said body, valve means for controlling said conduit, a syphon tube in communication with said conduit at the underside of said portion, there being a safety discharge conduit extending from said main conduit to the exterior of the body, said body having an auxiliary conduit independent of said main conduit and extending from the underside of said portion adjacent said syphon tube to the exterior of said body, and means for closing said auxiliary conduit.

5. In combination, a container having a neck portion provided with an outlet, a valve body having a plug portion extending into said outlet and having a main conduit extending from the base of said plug portion to the exterior of said body, valve means for controlling said conduit, a syphon tube in said container secured to said plug portion and in communication with said conduit, there being a safety discharge conduit extending from said main conduit to the exterior of said plug portion, said body having an auxiliary conduit independent of said main conduit and extending from the base of said plug portion adjacent said syphon tube to the exterior of said body, whereby liquid trapped between the inner walls of said container at said neck portion and said syphon tube at the base of said plug portion can be drained through said auxiliary conduit, and means for closing said auxiliary conduit.

DANIEL MAPES.